United States Patent [19]

Parker

[11] Patent Number: 5,123,833
[45] Date of Patent: Jun. 23, 1992

[54] FAST CYCLE PLASTICATOR/INJECTOR UNIT FOR MOLDING MACHINES

[76] Inventor: John C. Parker, 1800 N. Bolten, Jacksonville, Tex. 75766

[21] Appl. No.: 678,059

[22] Filed: Apr. 1, 1991

[51] Int. Cl.⁵ .................................... B29C 45/60
[52] U.S. Cl. .................... 425/557; 264/328.4; 366/79; 366/289; 425/561; 425/562; 425/585
[58] Field of Search ............ 425/256, 544, 557, 558, 425/559, 560, 561, 562, 585, 130, 382.3; 264/328.4, 328.5, 328.19; 366/77, 79, 289

[56] References Cited

U.S. PATENT DOCUMENTS

| | | | |
|---|---|---|---|
| 2,581,477 | 1/1952 | Franks | 173/24 |
| 3,395,424 | 8/1968 | Novel | 264/328.19 |
| 4,557,683 | 12/1985 | Meeker et al. | 425/147 |
| 4,695,238 | 9/1987 | Taniguchi | 264/328.19 |
| 4,784,819 | 11/1988 | Spurr | 264/328.19 |

Primary Examiner—Tim Heitbrink
Attorney, Agent, or Firm—James O. Dixon

[57] ABSTRACT

A fast cycle plasticator/injector unit for plastic molding machines having a screw type plasticating extruder for feeding thermoplastic material through a sealed fluid flow path to an accumulator which periodically feeds the thermoplastic material through a sealed fluid flow path to an injector that comprises a cylinder with an inlet and an outlet port and a powered piston valve element disposed for reciprocating axial and rotary motion within said cylinder and having a fluid flow channel along a portion of its length in cooperative structural relationship with said inlet port to provide an open fluid flow channel between the inlet port and the charge chamber of said cylinder when the piston is in a first rotational orientation and to block fluid flow from the inlet port to the cylinder when the piston is in a second rotational orientation.

14 Claims, 2 Drawing Sheets

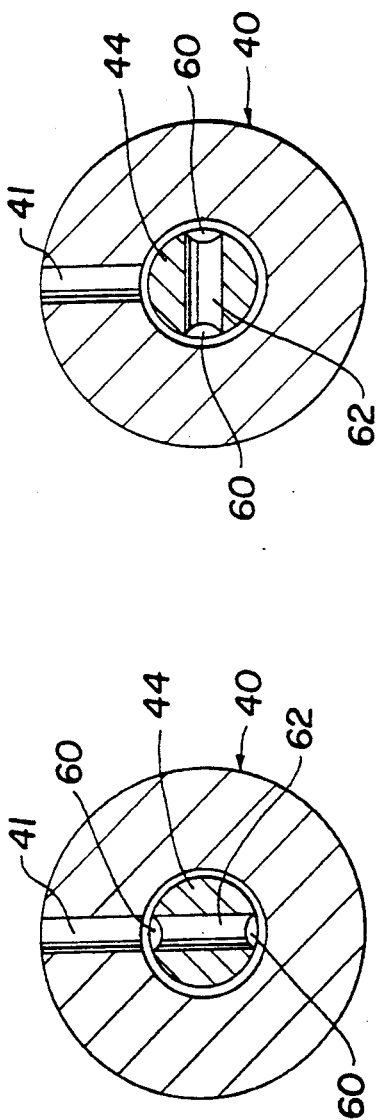
Fig. 3
Fig. 4
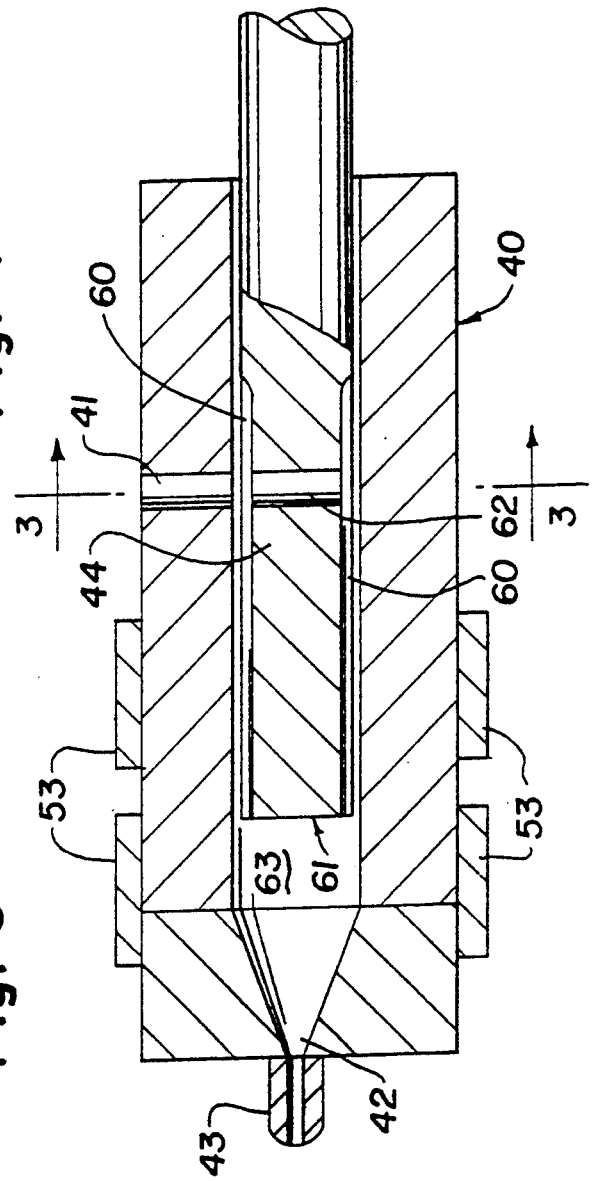
Fig. 2

FAST CYCLE PLASTICATOR/INJECTOR UNIT FOR MOLDING MACHINES

FIELD OF INVENTION AND BACKGROUND

This invention relates to plastic injection molding machines and more particularly to a plasticator/injector unit for injection molding machines having novel valving and material feed arrangements.

In injection molding raw stock usually in the form of beads or granules of plastic or polymeric material is fed into a plasticator that may take the form of a screw-like element rotating in a long heated cylindrical barrel. As the screw element is rotated the feed stock material is moved through the barrel under the pressure of the screw element while being heated to its molten state. As the screw element continues its rotation the molten plastic is then pumped under relatively moderate pressure into the chamber of an injection cylinder. When the chamber is fully charged, the molten plastic therein is injected into a mold from the chamber under extremely high pressure.

In some types of plasticator injector machines, an accumulator chamber is used to hold the molten plastic extruded from the screw plasticator until enough has been accumulated to fill the chamber of the high pressure injection cylinder. The plastic must be injected into the mold at very high pressure.

The injection molding process is cyclical in that after the high pressure injection of plastic into the mold a finite amount of time it is required to remove the product from the mold or otherwise provide an empty mold to receive the next injection of plastic. However, the plasticating process feeding the cyclical mold process is most efficient as a continuous process that does not require the stopping and starting of the plasticator unit. Such stopping and starting results in uneven heating and treatment of the plastic. Thus, it is a usual practice in plasticator/injector machines to provide a means to accumulate the molten plastic emerging from the plasticator in an amount sufficient to charge the high pressure injection cylinder with enough plastic to fill the mold when injected under high pressure.

Injection of the plastic into the mold must be carried out under extremely high pressure and thus it has been found advantageous to isolate the plasticator and accumulator units from the injection chamber during the injection process so that only the injector part of the machine must be made to withstand the very high injection pressures. Since only the process of injecting the plastic into the mold requires very high pressure, the plastic can be transferred from the accumulator into the injection cylinder under a relatively moderate pressure, for example, a pressure only about equal to the pressure produced by the plasticator screw in extruding the molten plastic.

Some machines now in use provide a reciprocating inline screw element in the plasticator inline with the injection chamber so that plastic accumulates in a chamber created as the screw element moves back through the cylinder. Then as the screw is moved forward the accumulation of plastic is transferred through one way valving into an injection chamber. Extremely high pressure is then used to inject the plastic of the chamber into the mold with the one way valve blocking the high pressure from the plasticator and accumulator areas.

In another type of injection molding machine, a reciprocating screw-type plasticator is arranged inline with the injection channel to the mold and a side chamber is used as the injection chamber which is filled by plastic accumulated in front of the plasticator screw as it is moved back into the plasticator. A rotary shutoff valve is used to isolate the plasticator from the extremely high pressure injection of plastic from the side chamber. After injection, the rotary valve is opened and the screw is moved forward to pump additional plastic into the injection cylinder.

In still another form of injection molding machine, a non-reciprocating screw type plasticator is arranged off axis from the injector cylinder and extrudes plasticized material into a side chamber buffer reservoir. When sufficient plastic has accumulated in the reservoir chamber it is forced out of the reservoir by either piston or gas pressure through a valved channel or conduit into and an injection cylinder chamber. The conduit valve when closed isolates the buffer chamber and plasticator from the high pressure of injection.

Examples of the above described injection molding machines are shown in U.S. Pat. No. 2,581,477 to G. Triulzi, U.S. Pat. No. 3,395,424 to R. Nouel, U.S. Pat. No. 4,557,683 to G. Meeker et al, U.S. Pat. No. 4,695,238 to Y. Taniguchi and U.S. Pat. No. 4,784,819 to R. Spurr.

Machines of the type above described have been found to have certain disadvantages. For example, the mechanisms required in the reciprocating screw machines have added to the complexity and consequently the cost of those machines. The cut-off valves used to isolate the accumulator sections from the high pressure injection sections in some machines tend to leak around their control shafts dripping plastic on and in the machines. In addition, in many machines the plastic material may not be uniformly heated or otherwise treated either because the plasticator screw must be stopped periodically while material is transferred or ejected from the accumulator or injection chambers. Non-uniform treatment of the mateiral may be because of material transfer systems wherein the first portion of the material entering a chamber is the last portion to leave during transfers resulting in unequal heating and treating times.

OBJECTS AND SUMMARY OF INVENTION

Such disadvantages are eliminated by the fast-cycle plasticator/injector unit of the present invention wherein an off axis stationary screw type plasticator is arranged for nonstop operation to continuously extrude plasticated material into an accumulator reservoir. A plunger in the accumulator is arranged to transfer plasticated material into the injection chamber without the necessity of stopping the plasticator. The plasticated material is admitted to the injection cylinder through a rotary valve mechanism constituted as an integral part of the injection plunger. Both the accumulator chamber and the injector chamber are filled with plasticated material beginning at their output end so that material inserted first is ejected first. Thus, the resident time of the plasticated material and any part of the machine and therefore the heating, cooling and treatment of the material is more nearly uniform for all portions of the material throughout the process.

The novel valving arrangement of the machine of the present invention allows essentially continuous operation of the screw plasticator and eliminates many of the sources of leakage that may have caused difficulties in prior art machines.

It is an object then of the present invention to provide a plasticator/injector unit for injection molding machines wherein continuous operation of the plasticator provides more uniform treatment of the plastic material in preparation for molding.

It is a further object of the present invention to provide a plasticator/injector unit having novel valving arrangements that eliminate sources of troublesome plastic leakage.

It is a still further object of the present invention to provide a plasticator/injector unit incorporating and "off axis" screw type plasticator in conjunction with novel accumulator and valving means thus allowing continuous operation of the plasticator.

These and other objects, advantages and features of the present invention will become apparent from the following detailed description of a preferred embodiment of the invention when read with reference to the accompanying drawings.

BRIEF DESCRIPTION OF DRAWINGS

FIG. 2 illustrates diagrammatically a side elevation sectional view of the injection cylinder and plunger/valve combination of the injector of the present invention;

FIG. 3 illustrates diagrammatically a sectional end view taken along lines 3—3 of FIG. 2 of the injection cylinder and plunger/valve combination with the valve in the "open" position; and FIG. 4 is the same as FIG. 3 with the exception that the valve is in the "closed" position.

DESCRIPTION OF A PREFERRED EMBODIMENT

Figure 1:
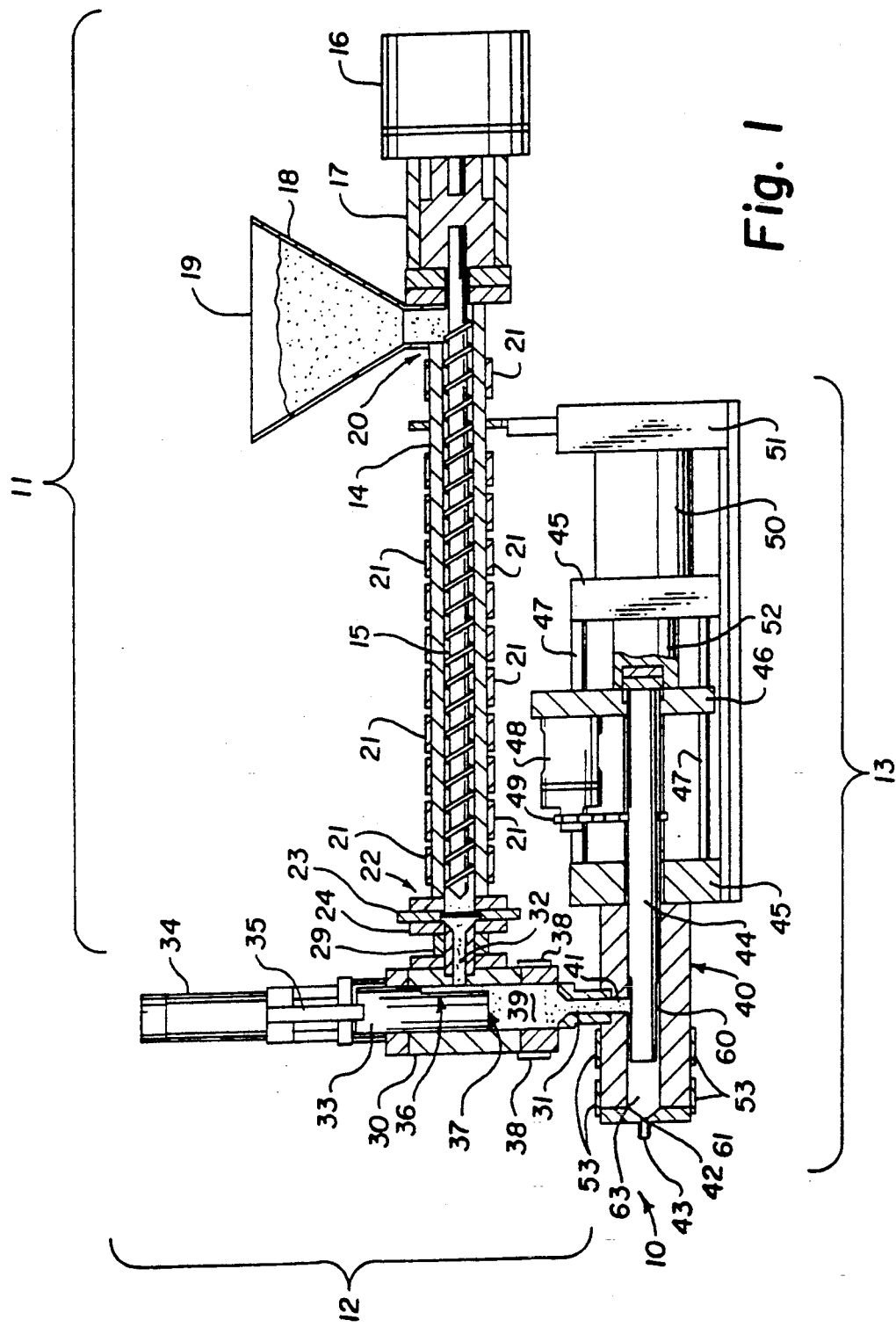
FIG. 1 illustrates diagrammatically a side elevation view, partly in section, of the plasticator/injector machine of the present invention.

Turning now to FIG. 1 there is shown in schematic fashion a side elevation view, partly in section, of the preferred embodiment of the plasticator/injector machine 10 of the present invention. The machine 10 comprises a plasticator section 11, an accumulator section 12 and an injector section 13.

The plasticator section 11 comprises a long barrel or cylinder element 14, heated by electrical heating elements 21. Disposed for fixed position rotation within the barrel 14 is a feed screw element 15. Feed screw 15 is driven in rotation by hydraulic motor 16 through transmission 17. A hopper 18 is provided to funnel unmelted plastic feed stock material 19 into the plasticator barrel 14 at the feed end 20. Feed stock material 19 usually is in the form of granules or pellets of plastic or polymeric material is moved along the barrel 14 of the plasticator 11 by rotation of the feed screw 15.

External electrical heating elements 21 heat the material 19 as it is moved along the plasticator barrel 14. As is standard in plasticators of this type as the plastic material moves through the plasticator it is heated by the friction of the rotary screw as well as by the heaters 21 to its molten or plastic state. The plasticated material under pressure from the screw element is extruded from the exit end 22 of the plasticator barrel 14 through a screen element 23 for removal of impurities.

Screen element 23 is held in a "fast change" screen frame 24 to allow the impurity screens 23 to be changed without stopping the operation of the plasticator section 11.

The above described plasticator section is of standard design for non-reciprocating screw plasticators currently commercially available.

Accumulator section 12 comprises an accumulator cylinder 30 having an outlet passage 31 at its lower end and an inlet passage 32 near its upper end. An unvalved sealed fluid flow connection 29 is provided between the output side of the screen changer frame 24 and the inlet passage 32. Outlet passage 31 is connected by sealed unvalved connection 28 to the inlet of injector 13.

Disposed for reciprocal motion within cylinder 30 is a plunger 33 in fluid tight contact with the walls of the cylinder 30. Plunger 33 is externally connected through rod 35 to the piston of hydraulic actuator 34 mounted to accumulator cylinder 30.

Plunger 33 is provided with a channel 36 along its side connecting with inlet passage 32. The channel 36 extends from the lower or internal face 37 of plunger 33 for a distance such that the inlet passage 32 is not closed by the plunger 33 at any time during a full stroke of the plunger 33. Heating elements 38 keep the accumulator cylinder 30 at a temperature appropriate for the proper handling and flow of the melted plastic material therethrough.

Injector section 13 comprises a high pressure injection cylinder 40 with inlet port 41 and outlet port 42. Outlet port 42 connects to an injection nozzle 43 through which the melted plastic is forced under high pressure via appropriate valves and manifolds into molds not shown. High pressure injection cylinder 40 is mounted on a frame 45. Mounted for reciprocal and rotary movement within the injection cylinder 40 is a piston 44 that acts as a rotary valve element and high pressure injection plunger. Piston member 44 extends through the back of cylinder 40 to pressure plate 46 where it is anchored with free rotational movement. Pressure plate 46 is mounted for horizontal sliding movement along guide rods 47 extending between upright members of frame 45.

Also mounted on pressure plate 40 is a rotary valve actuator 48 the output of which is coupled by a transmission member 49 such as a chain, belt or gears to drive piston 44 in rotational movement. Piston member 44 is driven in reciprocal horizontal motion by rod 52 of hydraulic injector cylinder 50 mounted on frame member 45. Cylinder 50 is powered through manifold 51 by pressurized hydraulic fluid from a source not shown.

Heater elements 53 maintain the injection cylinder 40 at a temperature appropriate for the proper handling and flow of the melted plastic therein.

The structure of piston 44 and its operation as a combination rotary valve and high pressure injection plunger is illustrated in more detail in drawing FIGS. 2, 3, and 4.

FIG. 2 illustrates diagrammatically in cross section the high pressure injection cylinder 40 with inlet port 41, outlet port 42, injection nozzle 43, piston 44 and heaters 53. Piston 44 is shown in the "valve open" position in both FIG. 2 and the cross sectional end view of FIG. 3. Piston 44 shown just after reaching the full extent of its injection stroke has one or more channels 60 extending rearward from the front face 61 of the piston for a distance sufficient to allow communication of the channels with the inlet port 41. At times it may be desirable to provide more than one channel and in such instances it is desirable to provide passages such as passage 62 interconnecting the channels 60 near the rearward ends thereof.

At the end of an injection stroke with the piston 44 in position as shown in FIG. 2 flow through outlet port 42 has been stopped and piston 44 has been rotated to its "valve open" position by actuator 48. Molten plastic material under relatively moderate pressure then flows through inlet port 41 thence through channels 60 and passages 62 to begin refilling the injection chamber of the cylinder 40 beginning at its forward end. As the injection chamber 63 fills with molten plastic piston 44 is pushed back by the incoming plastic until the injection chamber has received a full charge of molten plastic. Actuator 48 then rotates piston 44 to the "valve closed" position shown in FIG. 4.

At this point hydraulic injector cylinder 50 is actuated driving injector cylinder rod 52 against pressure plate 46 to ram piston 44 forward and inject the molten plastic from the injection chamber 63 into the mold at a pressure of up to about 40,000 psi.

It is to be realized that piston 44 although it may not be apparent from the drawings is machined to fit tightly into its cylinder 40 to form the requisite fluid tight seal with the walls of the cylinder. Thus, with piston 44 rotated to the valve closed position inlet port 41, accumulator section 12 and plasticator section 11 of the machine are effectively sealed and isolated from the extremely high injection pressure developed in the injection chamber 63.

In operation of the fast cycle plasticator/injector of the present invention feed stock 19 in the form of thermoplastic granules or pellets is fed into hopper 18 and funneled in the input 20 of plasticator 11. The granular feed material 19 is carried along the heated plasticator barrel 14 by rotating feed screw element 15 powered by hydraulic motor 16. As the granular plastic material is moved along barrel 14 by screw element 15 it is heated by friction and contact with the heated plasticator barrel 14 to its plasticating point, i.e., becomes molten or liquid.

Plasticated (molten) material is extruded under pressure exerted by the screw element 15 through a changeable screen element 23 where impurities are removed and then through sealed fluid flow connection 29 to inlet passage 32. The fluid plastic flows under pressure through inlet passage 32 and channel 36 running lengthwise along plunger 33 into the accumulator chamber of accumulator cylinder 30 below plunger 33.

With the inlet port 41 to the injector closed by piston/valve 44 the molten plastic accumulates and fills the chamber below the plunger 33 where it is held at its proper temperature by accumulator heaters 38. As the plastic accumulates in the chamber 39 of cylinder 30 it forces plunger 33 upward against the rod 35 of hydraulic ram 34 in which the hydraulic pressure has been released.

Upon accumulation of sufficient fluid plastic in the accumulator chamber 39 to fill the injection chamber 40 rotary valve actuator 48 is operated to rotate piston 44 to the "valve open" position and hydraulic ram 34 is actuated to apply downward pressure to plunger 33 and force molten plastic from accumulator chamber 39 through inlet port 41, through valve channels 60 and passages 62 into the injection chamber 63 of injector cylinder 40.

Because the pressure exerted by plunger 33 to transfer the plastic charge from the accumulator 12 to the injection cylinder 40 is not allowed to exceed the maximum extrusion pressure produced by the plasticator 11, material from the plasticator continues to be fed through channel 36 into the accumulator continuously even during the downward stroke of plunger 33 to inject plastic into the chamber 63 of injection cylinder 40. Thus, rotation of the feed screw element 15 need not be stopped during the transfer period.

(It is to be recognized that in some molding processes it may be desirable to interrupt the continuous operation of plasticator 11 because of different timing requirements and thus provision may be made for such interruptions. In addition there may be provided a limit switch arrangement, not shown, to detect overfilling of accumuator chamber 39 and stop the operation of plasticator 11 while the overfill condition exists.)

The incoming charge of liquid plastic from the accumulator 12 is fed into the injection chamber 63 at sufficient pressure to force piston 44 to move to the right (as shown in the drawing) as the injection chamber 63 fills to its full charge capacity. When the injection cylinder is fully charged valve actuator 48 is operated to rotate piston/valve 44 to its "valve closed" position as illustrated in FIG. 4.

With piston/valve 44 closed pressurized fluid is fed to the hydraulic injector cylinder 50 to apply injection pressure to piston 44 expelling the molten plastic from injection chamber into a mold through outlet port 42 and injection nozzle 43.

All the while piston/valve 44 is in the "valve closed" position the accumulator 10 and plasticator 11 are isolated from the injection pressure. With valve 44 closed accumulator chamber 39 begins to fill again as screw element 15 continues to turn extruding plastic into the accumulator.

Thus, it can be seen that so long as the injection process is continued there is no necessity to interrupt the operation of the plasticator. The molding process can be carried out with the present invention at a significantly increased rate over prior machines of equally uncomplicated structure. Until the present invention injection molding machines of much more complex and expensive structure were required to achieve operating rates comparable to the fast cycle machine disclosed hereinabove.

By the elimination of the necessity of complicated valving between the plasticator and the accumulator and the novel use of a rotary valve structure as an integral part of the injection piston, the structure and construction of the plasticator/injector unit of the present invention has been greatly simplified from that of the prior art. In addition, many bothersome spurious leakage paths found in prior art machines have been eliminated.

Although illustrated herein in a single embodiment it is to be understood that features and engineering details may be varied as dictated by particular need and that many changes and modifications may be made in the above described apparatus without departing from the spirit or scope of this invention which is to be limited only as set forth in the following claims.

Having described the invention it is claimed:

1. A fast cycle plasticator injector unit for injection plastic molding machines comprising: plasticating extruder means for heating and continuously outputting a flow of thermoplastic material, an accumulator comprising a variable volume accumulation chamber having an inlet passage for receiving said continuous flow of thermoplastic material from said plasticating extruder means and an output passage for periodically expelling therethrough thermoplastic material accumulated within said accumulation chamber, and an injector comprising cylinder means and piston means, said cylinder means and said piston means together forming a variable volume injection chamber having an outlet port and an inlet port, said piston means having at least one fluid flow channel along a portion of the length thereof and said piston means being disposed at least partially within said cylinder means for controlled reciprocal axis motion over a predetermined range and controlled rotational motion over a predetermined range therein, said at least one fluid flow channel being disposed in structural relationship with said inlet port to form rotary valve means for providing an open fluid flow path between said outlet passage of said accumulator and said injection chamber through said at least one channel in a first rotational orientation of said piston means and for blocking fluid flow between said outlet passage of said accumulator and said injection chamber in a second rotational orientation of said piston means.

2. The plasticator injector unit of claim 1 wherein said at least one channel is of sufficient length for said rotary valve means to establish said open flow path over the entire predetermined range of axial reciprocal motion of said piston means.

3. The plasticator injector unit of claim 1 wherein said variable volume accumulation chamber is comprised of a cylinder element including said inlet passage and said outlet passage and a plunger disposed at least partially within said cylinder element for reciprocal axial motion therein over a predetermined range to vary the volume of said accumulator chamber, said plunger means having channel means for defining an open fluid flow path between said inlet passage and said accumulation chamber over the entire range of reciprocal axial motion of said plunger.

4. The plasticator injector unit of claim 1 wherein said axial motion of said piston means in one axial direction is under pressure of external hydraulic means for driving said piston means and in an opposite axial direction is under pressure of fluid plastic material admitted to said injection chamber through said rotary valve means.

5. The plasticator injector unit of claim 3 wherein said plunger is moved in one axial direction under pressure from external hydraulic means for driving said plunger and in an opposite axial direction under pressure of fluid plastic material received through said channel means from said plasticator extruder.

6. The plasticator injector unit of claim 2 wherein said axial motion of said piston means in one axial direction is under pressure of external hydraulic means for driving said piston means and in an opposite axial direction is under pressure of fluid plastic material admitted to said injection chamber through said rotary valve means.

7. The plasticator injector unit of claim 2 wherein said variable volume accumulation chamber is comprised of a cylinder element including said inlet passage and said outlet passage and a plunger means disposed at least partially within said cylinder element for reciprocal axial motion therein over a predetermined range to vary the volume of said accumulation chamber, said plunger means having channel means for defining an open fluid flow path between said inlet passage and said accumulation chamber over the entire range of reciprocal axial motion of said plunger means and wherein said plunger means is moved in one axial direction under pressure from external hydraulic means for driving said plunger means and in an opposite axial direction under pressure of fluid plastic material received through said channel means from said plasticator extruder.

8. The plasticator injector unit of claim 6 wherein said variable volume accumulation chamber is comprised of a cylinder element including said inlet passage and said outlet passage and a plunger means disposed at least partially within said cylinder element for reciprocal axial motion therein over a predetermined range to vary the volume of said accumulation chamber, said plunger means having channel means for defining an open fluid flow path between said inlet passage and said accumulation chamber over the entire range of reciprocal axial motion of said plunger means and wherein said plunger means is moved in one axial direction under pressure from external hydraulic means for driving said plunger means and in an opposite direction under pressure of fluid plastic material received through said channel means from said plasticator extruder.

9. In a plastic molding machine injector having a high pressure cylinder with a molding material injection outlet at its forward end and a molding material inlet port remote from said outlet and further having piston means for expelling molding material from said cylinder through said outlet by hydraulically powered axial motion of said piston means within said cylinder towards said outlet, the improvement for controlling inletting of said molding material to said cylinder comprising means for producing controlled rotational movement of said piston means within said cylinder and at least one fluid flow channel disposed along at least a portion of the length of said piston means and in cooperative relationship with said inlet port to establish free fluid flow between said inlet port and said cylinder in a first rotational orientation of said piston and to block fluid flow between said inlet port and said cylinder in a second rotational orientation of said piston.

10. The injector as set forth in claim 9 wherein said piston means has a predetermined range of axial motion and said at least one fluid flow channel is so constructed as to provide said free fluid flow over the full range of axial motion of said piston.

11. The injector of claim 9 wherein said piston means is movable between said first rotational orientation and said second rotational orientation by an externally applied force.

12. The injector of claim 10 wherein said piston means is movable between said first rotational orientation and said second rotational orientation by an externally applied force.

13. A machine for continuous plasticating and high pressure injection molding of thermoplastic materials comprising: a plasticator section, an accumulator section and an injector section, said plasticator section comprising an extruder having a feed screw element mounted for inplace rotational movement within a heated barrel, said extruder being operative to move thermoplastic feed material from an input thereof to an output thereof as said material is plasticated by surface contact with said heated barrel, friction and externally applied heat, said accumulator section comprising a powered plunger disposed for reciprocal axial motion over a predetermined range within a cylinder from one end of said cylinder to form a chamber of variable volume within said cylinder, said cylinder having an outlet passage from said chamber opposite said plunger and an inlet passage adjacent said plunger, said plunger having a channel over a portion of its length positioned to provide a material flow path between said inlet passage and said chamber over the entire predetermined range of reciprocal axial motion of said plunger, said input passage being connected by a sealed flow path to the output of said plasticator section, said injector section comprising a high pressure injection cylinder and a powered piston valve element disposed for rotational and reciprocal axial motion within said cylinder to form a variable volume injection chamber within said cylinder, said injection chamber having an outlet port at an end of said chamber opposite said piston and an inlet port, said piston element having at least one channel along a portion of its length in cooperative relationship with said inlet port to form a rotary valve means for providing a fluid flow path between said outlet passage of said accumulator and said injection chamber when said piston is in a first rotational orientation and for providing an effective fluid seal between said outlet passage of said accumulator and said chamber when said piston is in a second rotational orientation.

14. A machine as defined in claim 13 wherein said piston valve element has a predetermined range of axial motion and said at least one channel of said piston valve element is of sufficient length to be operative over the entire predetermined range of axial motion of said piston valve.

* * * * *

UNITED STATES PATENT AND TRADEMARK OFFICE
CERTIFICATE OF CORRECTION

PATENT NO. : 5,123,833

DATED : June 23, 1992

INVENTOR(S) : John C. Parker

It is certified that error appears in the above-identified patent and that said Letters Patent is hereby corrected as shown below:

In Column 2, line 21, change "2,581,477" to --2,881,477--.

In Column 8, line 19, after "opposite" insert --axial--.

In Column 9, line 14, after "piston" insert --valve--.

Signed and Sealed this

Tenth Day of August, 1993

Attest:

MICHAEL K. KIRK

*Attesting Officer*   *Acting Commissioner of Patents and Trademarks*